US011019523B2

(12) United States Patent
Vikberg et al.

(10) Patent No.: US 11,019,523 B2
(45) Date of Patent: May 25, 2021

(54) DETERMINING MODULE AND METHOD PERFORMED THEREIN FOR HANDLING DUAL CONNECTIVITY IN A COMMUNICATION NETWORK

(71) Applicant: Telefonaktiebolaget LM Ericsson (publ), Stockholm (SE)

(72) Inventors: Jari Vikberg, Järna (SE); Göran Hall, Mölndal (SE); Mattias Wahlqvist, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/340,415

(22) PCT Filed: Oct. 18, 2016

(86) PCT No.: PCT/SE2016/051012
§ 371 (c)(1),
(2) Date: Apr. 9, 2019

(87) PCT Pub. No.: WO2018/074954
PCT Pub. Date: Apr. 26, 2018

(65) Prior Publication Data
US 2019/0230551 A1    Jul. 25, 2019

(51) Int. Cl.
*H04W 28/02* (2009.01)
*H04W 76/15* (2018.01)
(Continued)

(52) U.S. Cl.
CPC ....... *H04W 28/0252* (2013.01); *H04L 5/0035* (2013.01); *H04W 28/0226* (2013.01);
(Continued)

(58) Field of Classification Search
CPC ............... H04L 5/0035; H04L 5/0098; H04W 28/0252; H04W 76/34; H04W 76/15;
(Continued)

(56) References Cited

U.S. PATENT DOCUMENTS

2008/0188224 A1* 8/2008 Pani ...................... H04W 76/27
455/436
2009/0086676 A1* 4/2009 Meylan ............. H04W 36/0055
370/331

(Continued)

FOREIGN PATENT DOCUMENTS

| EP | 3086589 A1 | 10/2016 |
| WO | WO 2015/052582 A2 | 4/2015 |
| WO | WO 2015/106460 A1 | 7/2015 |

OTHER PUBLICATIONS

International Search Report and Written Opinion of the International Searching Authority, PCT/SE2016/051012, dated Jul. 13, 2017, 12 pages.

*Primary Examiner* — Benjamin H Elliott, IV
(74) *Attorney, Agent, or Firm* — Sage Patent Group

(57) ABSTRACT

Embodiments herein relate to a method performed by a determining module, for managing dual connectivity, DC, in a communications network. The communications network comprises a first and a second Radio Access Network, RAN, node. The first RAN node manages a first user plane bearer for a User Equipment, UE. The DC comprises communicating with the UE over the first RAN node and the second RAN node simultaneously. The determining module obtains information about characteristics of the UE and/or information about characteristics of a transport network between the first RAN node and the second RAN node. The determining module determines, based on the retrieved information, to (Continued)

adapt DC for the first user plane bearer via the second RAN node for communication with the UE.

18 Claims, 13 Drawing Sheets

(51) Int. Cl.
| | | |
|---|---|---|
| *H04L 5/00* | (2006.01) | |
| *H04W 72/04* | (2009.01) | |
| *H04W 76/34* | (2018.01) | |
| *H04W 84/00* | (2009.01) | |
| *H04W 28/08* | (2009.01) | |

(52) U.S. Cl.
CPC ... *H04W 28/0247* (2013.01); *H04W 28/0268* (2013.01); *H04W 72/0453* (2013.01); *H04W 76/15* (2018.02); *H04W 76/34* (2018.02); H04L 5/0098 (2013.01); H04W 28/08 (2013.01); H04W 72/048 (2013.01); H04W 72/0426 (2013.01); H04W 72/0486 (2013.01); H04W 84/00 (2013.01)

(58) Field of Classification Search
CPC ......... H04W 28/0226; H04W 28/0247; H04W 28/0268; H04W 72/0453; H04W 28/08; H04W 72/0426; H04W 72/048; H04W 72/0486; H04W 84/00
See application file for complete search history.

(56) References Cited

U.S. PATENT DOCUMENTS

| | | | |
|---|---|---|---|
| 2014/0241317 A1* | 8/2014 | Jamadagni | H04L 5/0032 370/331 |
| 2015/0098322 A1* | 4/2015 | Chen | H04W 28/0252 370/230 |
| 2015/0117183 A1* | 4/2015 | Heo | H04W 4/90 370/228 |
| 2015/0173047 A1* | 6/2015 | Yamada | H04W 28/18 370/329 |
| 2016/0143039 A1* | 5/2016 | Baldemair | H04W 72/1252 370/329 |
| 2016/0212790 A1* | 7/2016 | Fujishiro | H04W 28/0252 |
| 2016/0295442 A1* | 10/2016 | Virtej | H04W 72/1284 |
| 2016/0309379 A1* | 10/2016 | Pelletier | H04W 76/12 |
| 2018/0167994 A1* | 6/2018 | Fujishiro | H04W 72/04 |
| 2018/0368205 A1* | 12/2018 | Park | H04W 16/28 |
| 2019/0230551 A1* | 7/2019 | Vikberg | H04W 28/0268 |

* cited by examiner

DETERMINING MODULE AND METHOD PERFORMED THEREIN FOR HANDLING DUAL CONNECTIVITY IN A COMMUNICATION NETWORK

TECHNICAL FIELD

Embodiments herein relate to determining module and a method performed therein for handling dual connectivity in a network. Furthermore, a computer program and a computer readable storage medium are also provided herein.

BACKGROUND

In a typical communication network, wireless devices, also known as wireless communication devices, mobile stations, stations (STA) and/or user equipment (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node, such as e.g. a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (PGW), a Serving Gateway (SGW), a Policy and Charging Rules Function (PCRF), a Mobility Management Entity (MME) and a wireless or mobile device (UE) 10 is found. The LTE radio access, E-UTRAN, comprises one or more RAN nodes, such as eNBs.

FIG. 2 shows the overall E-UTRAN architecture and is further defined in for example 3GPP TS 36.300 v.13.1.0. The E-UTRAN comprises radio access nodes, such as eNBs, Home eNBs, which are also referred to as HeNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface and/or via an X2 GW. The radio network nodes are also connected by means of the S1 interface to the EPC comprising EPC nodes, such as MME, S-GW and HeNB GateWays (GW). More specifically the radio network nodes are connected to the MME by means of an S1-MME interface and to the S-GW by means of an S1-U interface. The S1-MME interface is used for control plane between eNodeB/E-UTRAN and MME. The main protocols used in this interface are S1 Application Protocol (S1-AP) and Stream Control Transmission Protocol (SCTP). S1AP is the application layer protocol between the radio network node and the MME and SCTP for example guarantees delivery of signaling messages between MME and the radio network node. The transport network layer is based on Internet Protocol (IP).

A subset of the S1 interface provided functions are:
S1-interface management functions such as S1 setup, error indication, reset and the radio network node and MME configuration update.
UE Context Management functionality such as Initial Context Setup Function and UE Context Modification Function.
E-UTRAN Radio Access Bearer (E-RAB) Service Management functions e.g. Setup, Modify, Release.
Mobility Functions for wireless devices in EPS Connection Management (ECM)-CONNECTED, e.g. Intra-LTE Handover and inter-3GPP-Radio Access Technology (RAT) Handover.
S1 Paging function.
Non Access Stratum (NAS) Signaling Transport function.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of the mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

In order to increase the capacity in the network a new RAN feature called LTE Dual Connectivity (DC) has been specified in 3GPP for LTE in 3GPP TS 36.300 V12.10.0. In DC an UE may be connected to multiple RAN nodes, such as e.g. eNBs, at the same time, and hence may send and receive data on multiple paths. LTE/E-UTRAN according to 3GPP TS 36.300 V12.10.0 supports DC operation, whereby a UE with multiple Receivers (RX) and/or Transmitters (TX) is configured to utilize radio resources provided by two distinct schedulers, located in two RAN nodes connected via a non-ideal backhaul over the X2 interface in RRC_CONNECTED mode.

FIGS. 3a and 3b show the network interfaces for LTE DC control and user plane. For the control plane, which is shown in FIG. 3a, inter-eNB control plane signaling for DC is performed by means of X2 interface signaling. Control plane signaling towards the core network node, such as an MME, is performed by means of S1 interface signaling. In addition, there is only one S1-MME connection per DC UE 10 between the MeNB and the MME.

For the user plane, which is shown in FIG. 3b, two different user plane architectures may be possible, one in which the S1-U only terminates in the MeNB and the user plane data is transferred from MeNB to SeNB using the X2-U. A second architecture where the S1-U terminates in the SeNB may also be configured.

Within DC, concepts of a Master eNB (MeNB) and a Secondary eNB (SeNB) are introduced. The eNBs involved in dual connectivity for a certain UE may assume two different roles: an eNB may either act as an MeNB or as an SeNB. In DC as defined in 3GPP TS 36.300 V12.10.0 the UE may be connected to one MeNB and one SeNB. For DC the control plane signaling from a core network node, such as e.g. an MME, and the RAN network is performed via the S1 interface between the MeNB and the core network node. The control plane signaling between the RAN nodes is performed via an X2 interface. Hence the control plane signaling from the core network node to the SeNB is routed via the MeNB. The user plane (U-plane) signaling for DC may however be performed over two different architectures. According to a first architecture, the user plane signaling from the core network node, such as a Service Gateway (S-GW), is only transmitted to the MeNB via the S1 interface. The user plane data may then transmitted to the SeNB from the MeNB via the X2 interface. According to a second architecture the user plane signaling from the core network node via the S1 interface may be transmitted to both the MeNB and the SeNB.

Different bearer options may be configured for the different user plane architectures. The user plane connectivity depends on the bearer option configured and currently three alternatives exist. These are Master Cell Group (MCG) bearer, Secondary Cell Group (SCG) bearer and split bearer. For MCG bearers, the MeNB is U-plane connected to the S-GW via S1-U. The SeNB is not involved in the transport of user plane data.

For split bearers, the MeNB is U-plane connected to the S-GW via S1-U and in addition, the MeNB and the SeNB are interconnected via X2-U. The MeNB may perform a so called "Bearer splitting", i.e. splitting or dividing downlink traffic for a single bearer between MeNB and SeNB towards the UE. Thereby a traffic aggregation benefit may be achieved for a single bearer, i.e. traffic from a single bearer can be divided between MeNB and SeNB.

For SCG bearers, both the MeNB and the SeNB are directly connected with the S-GW via S1-U. A single bearer is transported either via the MeNB or the SeNB to the UE. A split of a single bearer between MeNB and SeNB is hence not possible, and traffic aggregation benefits, in the sense that UE traffic is received both from the MeNB and the SeNB, can only be achieved when the UE has more than one bearer.

However, although performance in the network in theory should be increased when data traffic is transmitted over two paths, DC may in many cases lead to a worsened Quality of Experience (QoE) for an end user as well as an increase in the signaling in the network without achieving any performance gain.

SUMMARY

An object of embodiments herein is to provide a method for managing dual connectivity which improves the performance and reliability of the communications network in an efficient manner. According to the embodiments herein knowledge about UE mobility pattern, services used by the UE, transport network topology and characteristics, and security gateway location is used to determine when DC is to be setup and which DC method to use.

According to an aspect of embodiments herein, the object is achieved by a method performed by a determining module, for managing dual connectivity (DC) in a communications network. The communications network comprises a first and a second Radio Access Network (RAN) node. The first RAN node manages a first user plane bearer for a User Equipment (UE). The DC comprises communicating with the UE over the first RAN node and the second RAN node simultaneously. The method comprises obtaining information about characteristics of the UE and/or information about characteristics of a transport network between the first RAN node and the second RAN node. The method further comprises determining, based on the retrieved information, to adapt DC for the first user plane bearer via the second RAN node for communication with the UE.

Embodiments herein further relate to a determining module, for managing dual connectivity (DC) in a communications network. The communications network comprises a first and a second Radio Access Network (RAN) node. The first RAN node manages a first user plane bearer for a User Equipment (UE). The DC comprises communicating with the UE over the first RAN node and the second RAN node simultaneously. The determining module is configured to obtain information about characteristics of the UE and/or information about characteristics of a transport network between the first RAN node and the second RAN node. The determining module is further configured to determine, based on the retrieved information, to adapt DC for the first user plane bearer via the second RAN node for communication with the UE.

It is furthermore provided herein a computer program comprising instructions, which, when executed on at least one processor, cause the at least one processor to carry out any of the methods above, as performed by the determining module. It is additionally provided herein a computer-readable storage medium, having stored thereon a computer program comprising instructions which, when executed on at least one processor, cause the at least one processor to carry out the method according to any of the methods above, as performed by the determining module.

The embodiments herein provide an efficient manner of reducing unnecessary signaling in the network, improving the QoE and reducing the load on individual nodes and/or transport links. By considering information regarding UE mobility, UE services and/or transport network configuration and characteristics when a decision on DC setup should be done, an optimized DC connection can be achieved.

BRIEF DESCRIPTION OF THE DRAWINGS

Embodiments will now be described in more detail in relation to the enclosed drawings, in which.

DETAILED DESCRIPTION

Embodiments herein provide a solution to the above mentioned drawbacks. A reason for the performance problem with known solutions may be that when a decision to activate DC is made, there might be limited knowledge about the current network characteristics, and/or the UE and its services. As a consequence, the DC decision might be sub-optimal, or may even lead to worse performance than when both bearers are communicated over one single RAN node. As there is a limited knowledge of the UE medium/long term characteristics, such as mobility pattern, what services the UE uses and which bandwidth limitations are set for the current services, DC might lead to a worse Quality of Experience (QoE) for the end user, or an increase in signaling in the network without any noticeable gain.

In some scenarios the transport network topology, such as e.g. a star, chain, or ring topology, and where in this topology security gateways are located may lead to the actual data packets being tromboned on one or more last mile links.

A further reason for the performance limitations in the known DC solutions may be that the actual data packets, may be sent on links that are highly loaded, since transport network characteristics, such as e.g. mid- and long-term load, delay, packet loss and/or jitter, may differ from what was known when the DC was initially activated.

The embodiments herein thus provide a solution for taking UE mobility pattern, services used by the UE, UE bandwidth limitations, transport network topology, transport network characteristics, and/or security gateway locations into consideration when a decision to adapt DC shall be taken.

Figure 1:
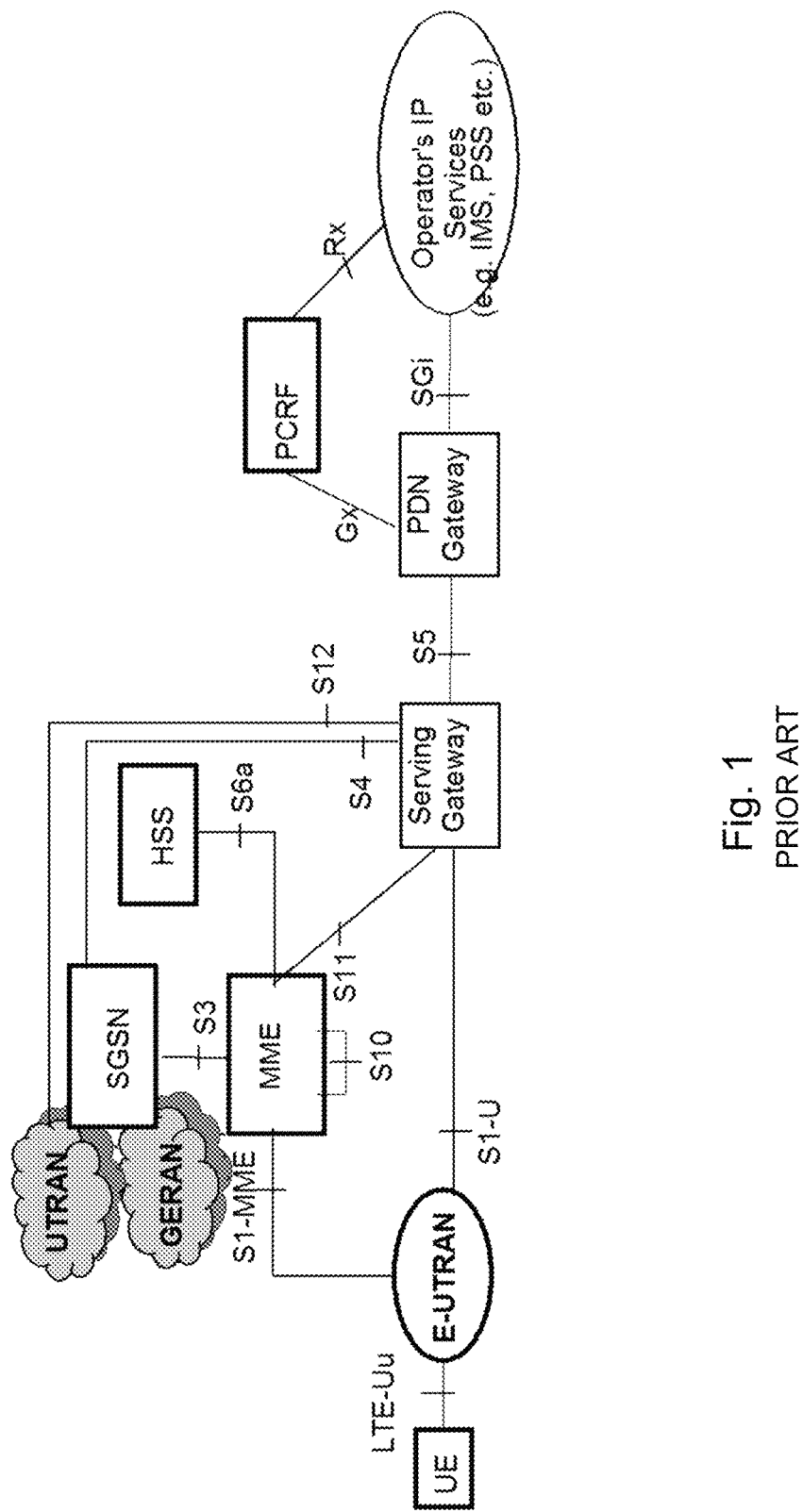
FIG. 1 is a schematic overview depicting a communication network according to prior art.
Figure 2:
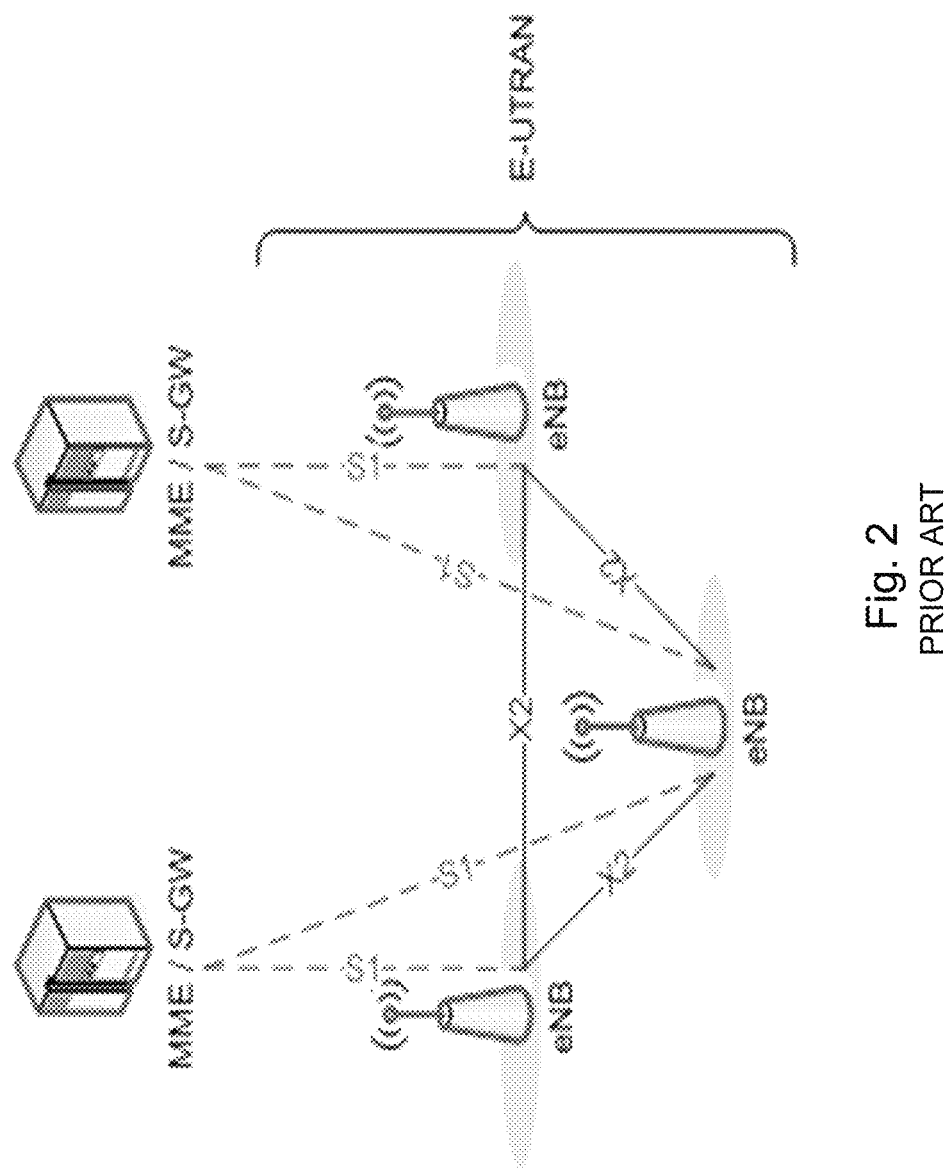
FIG. 2 is a schematic overview depicting a radio access network in connection with a core network.
Figure 3B:
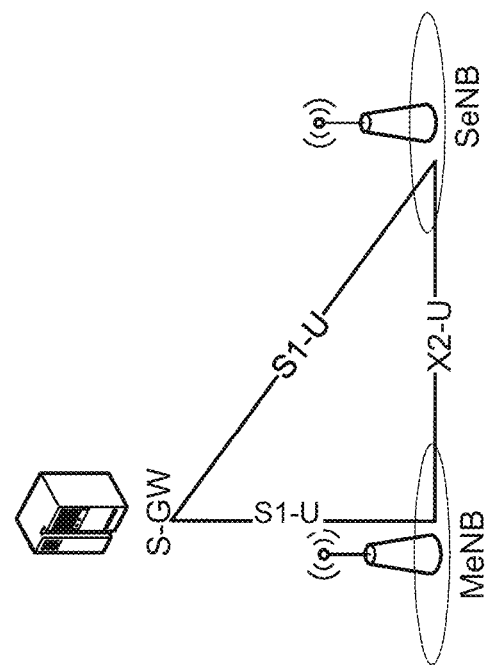
FIG. 3b is a schematic overview depicting network interfaces for a DC Control Plane.
Figure 3A:
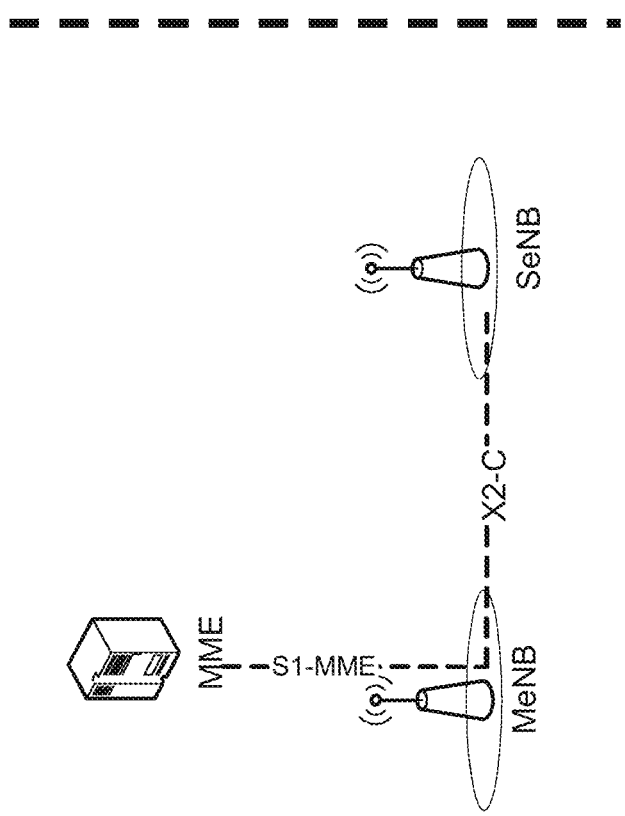
FIG. 3a is a schematic overview depicting network interfaces for a DC Control Plane.
Figure 4B:
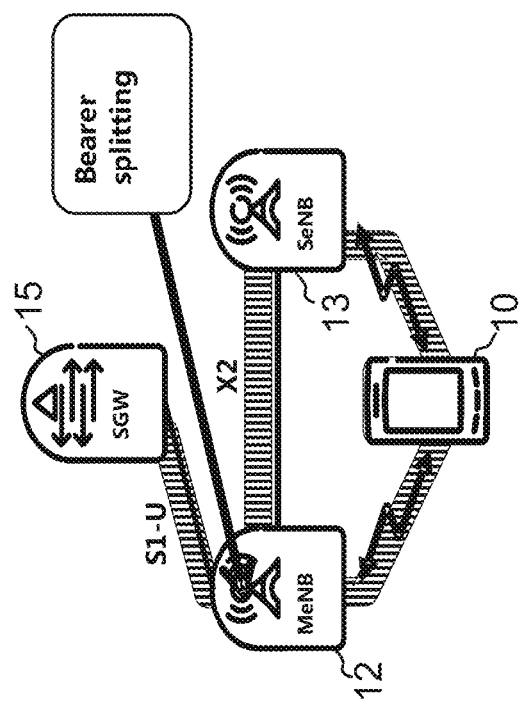
FIG. 4b is a schematic overview depicting an LTE DC Split bearer in a network.
Figure 4A:
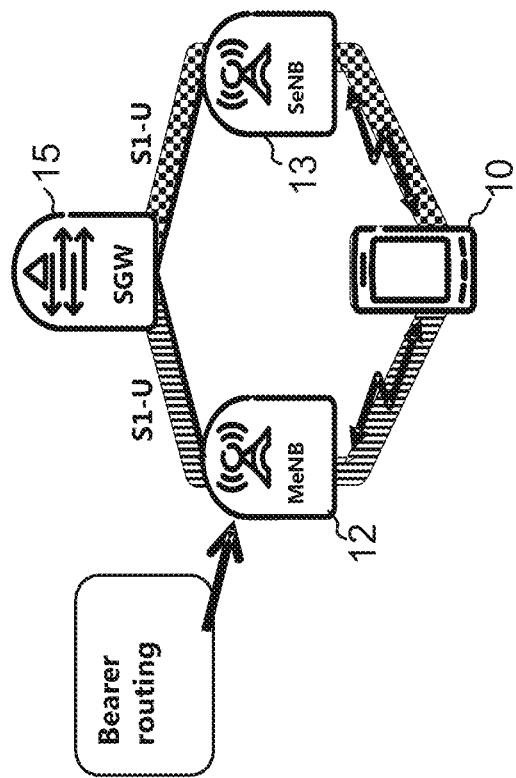
FIG. 4a is a schematic overview depicting an LTE DC SCG bearer in a network.

The different options of bearer routing are shown in FIG. 4a for an SCG bearer and FIG. 4b for a split bearer. SCG bearers are based on the concept of "Bearer routing". Bearer routing means that a single bearer is transported either via the first RAN node 12, herein referred to as MeNB, or the second RAN node 13, herein referred to as SeNB, to the UE 10. This also means that it is not possible to split a single bearer between the MeNB and the SeNB. Thereby the traffic aggregation benefits, in the sense that UE 10 traffic is received both from the MeNB 12 and the SeNB 13, can only be achieved when the UE 10 supports more than one bearer. However the SCG bearer has benefits over the split bearer when it comes to "transport tromboning", which is further described in relation to FIGS. 8a and 8b.

Split bearers are based on the MeNB 12 performing a splitting or dividing of the downlink traffic for a single bearer between the MeNB 12 and the SeNB 13 towards the UE 10, which is also referred to as Bearer splitting. This means that the traffic aggregation benefit can be achieved for a single bearer, i.e. traffic from a single bearer can be divided between MeNB 12 and SeNB 13.

Figure 5:
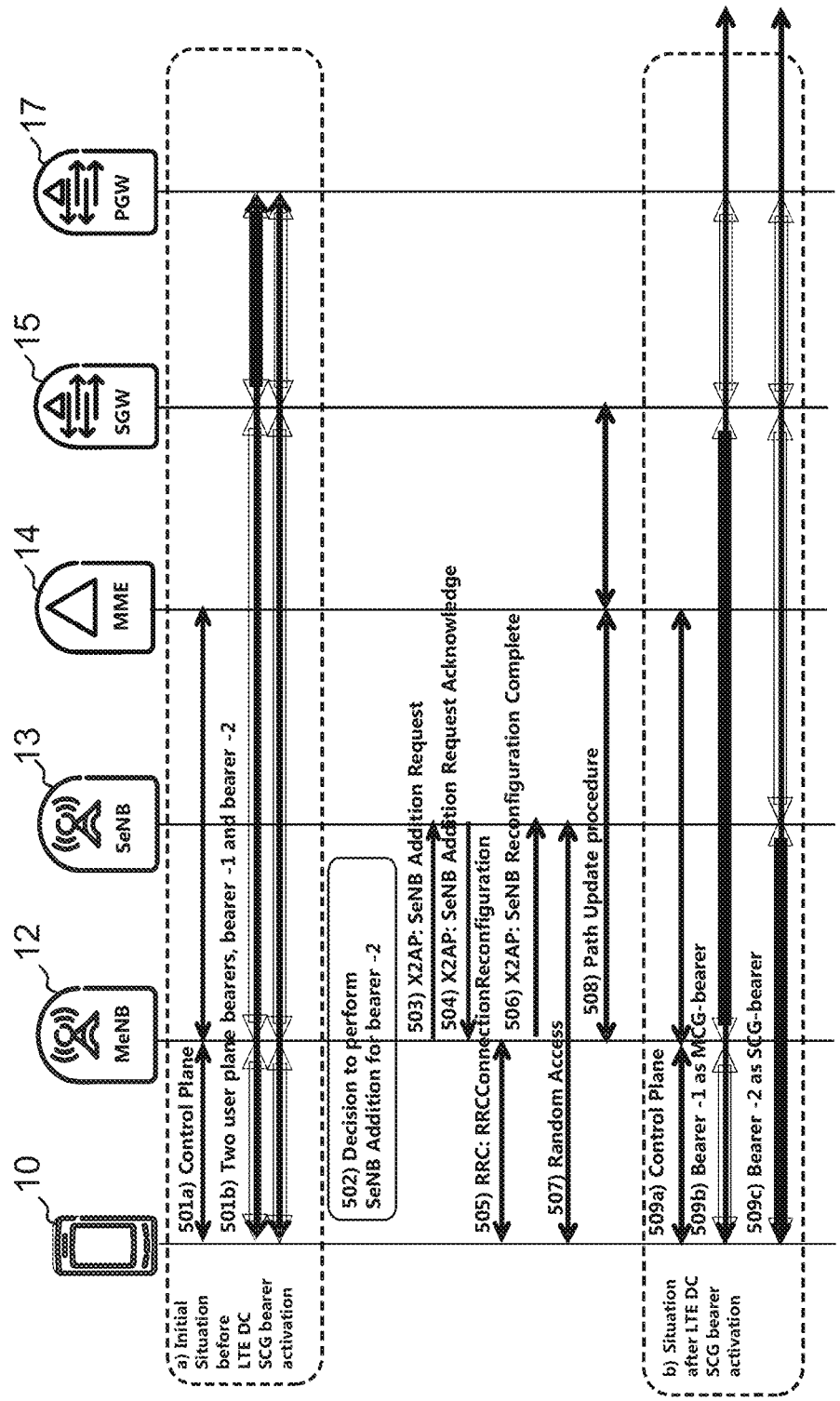
FIG. 5 is a signaling diagram depicting SeNB addition for an SCG bearer according to prior art.

FIG. 5 shows a signaling flow for activating a DC via the SeNB 13 for a SCG bearer in a current communications network.

Action 501a-c: In an initial situation the control plane signaling is communicated between the MeNB 12 and two user plane bearers are activated between the UE 10 and the MeNB 12. The MeNB 12 forwards the user plane data to the SGW 15.

Action 502: A decision to activate DC via the SeNB 13 is taken by the MeNB 12. In this case the MeNB 12 decides to perform the SeNB 13 Addition for bearer-2. This decision may be based on UE measurement reporting on any cell/carrier handled by SeNB 13 and possible on load information exchange between MeNB 12 and SeNB 13.

Action 503: When the MeNB 12 has decided to activate DC it sends an SeNB Addition Request to the SeNB 13 via the X2 or X2-C interface using X2 Application Protocol (X2AP) signalling.

Action 504: The SeNB 13 responds to the SeNB Addition Request with an SeNB Addition Acknowledge.

Action 505: When the SeNB 13 has responded with a SeNB Addition Request Acknowledge, the MeNB 12 and the UE 10 perform a RRCConnectionReconfiguration procedure in order to establish the bearer-2 between the UE 10 and the SeNB 13.

Action 506: The MeNB 12 informs the SeNB 13 that the SeNB reconfiguration is complete.

Action 507: The UE 10 then performs Random Access with the SeNB 13.

Action 508: The MeNB 12 then performs a Path Update procedure in order to set up the communication for bearer-2 between the SGW 15 and the SeNB 13.

Action 509a-c: In the situation after the DC SCG bearer activation the control plane signaling is still communicated between the MeNB 12 and a core network node 14, such as the MME. The bearer-1 is communicated as a MCG bearer between the UE 10 and the MeNB 12. Bearer-2 however, is now communicated as a SCG bearer between the UE 10 and the SeNB 13.

Figure 6:
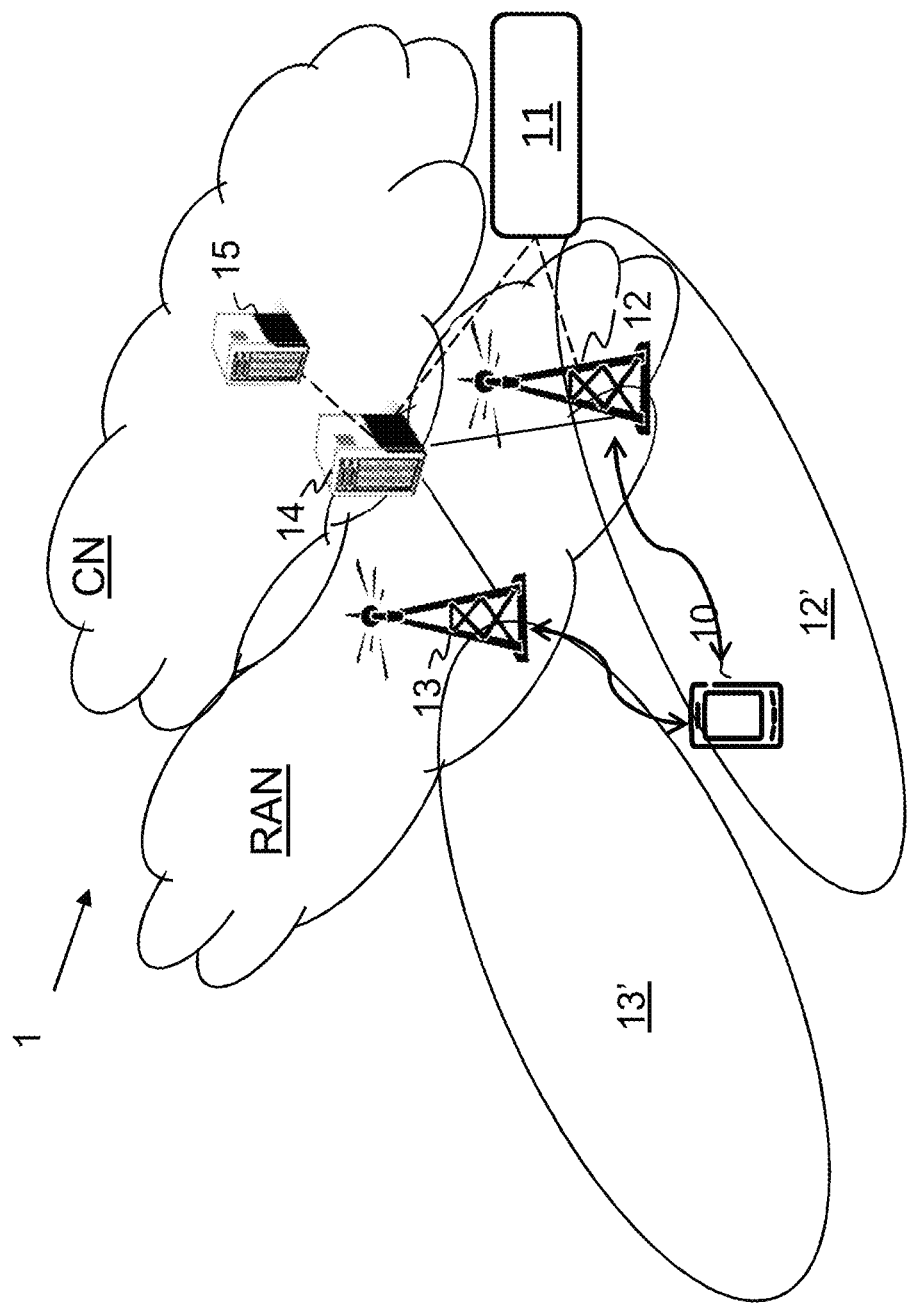
FIG. 6 is a schematic overview depicting a communication network according to embodiments herein.

Embodiments herein relate to a communication network in general. FIG. 6 is a schematic overview depicting a communication network 1. The communication network 1 comprises a RAN and a CN. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in both a 5G and an LTE context, however, embodiments are applicable also in further development of the existing communication systems such as e.g. 3G.

In the communication network 1, wireless devices e.g. a User Equipment (UE) 10 such as a mobile station, a non-access point (non-AP) STA, a STA, a wireless device and/or a wireless terminal, communicate via an Access Networks (AN), e.g. RAN, with a CN. It should be understood by those skilled in the art that an UE is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises a set of radio network nodes, such as radio network nodes 12, 13 each providing radio coverage over one or more geographical areas, such as a cell 12', 13' of a radio access technology (RAT), such as 5G New Radio (NR), LTE, UMTS, Wi-Fi or similar. The radio network node 12, 13 may be a radio access network node such as a radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 12, 13 depending e.g. on the first radio access technology and terminology used. The radio network nodes 12, 13 are comprised in the radio access network (RAN).

The radio network nodes 12, 13 communicate with a first core network node 14 comprised in the communications network 1, such as e.g. an MME, which may further be connected to a second core network node 15, such as e.g. an SGW.

Figure 7:
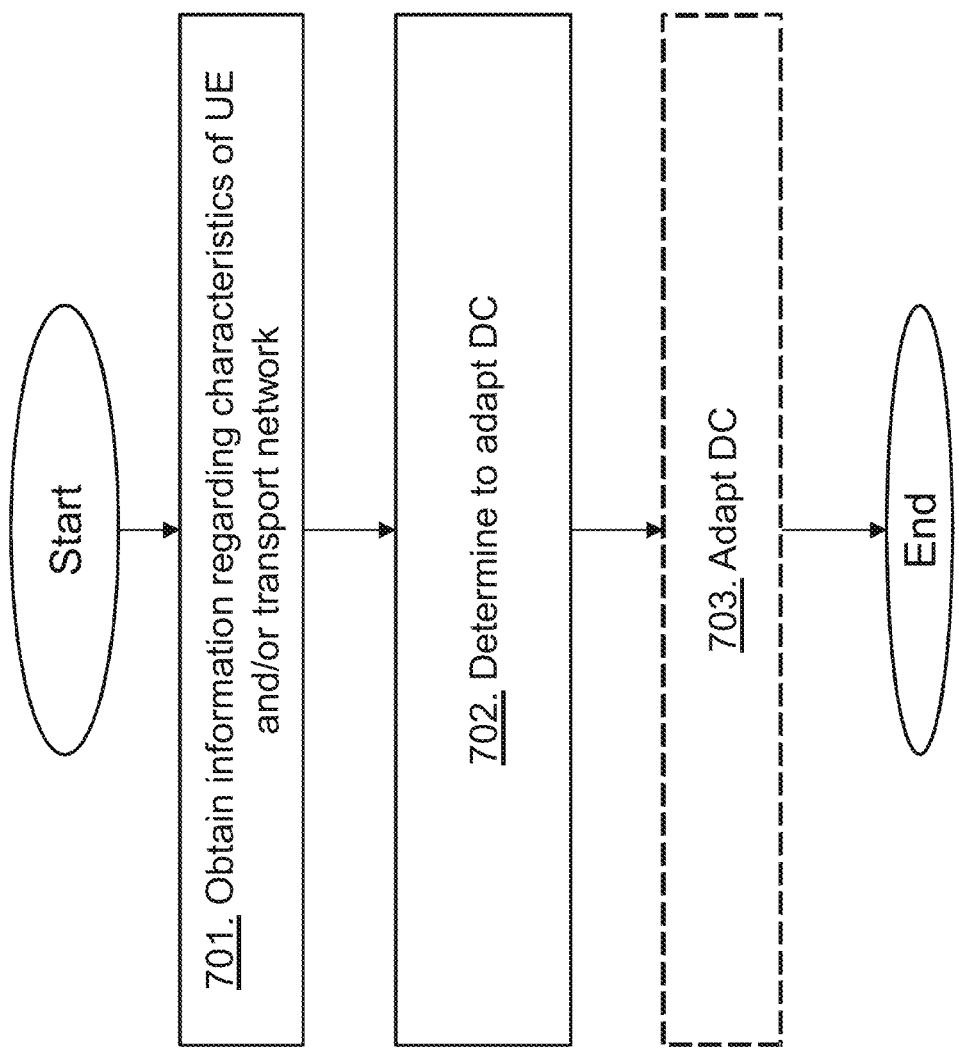
FIG. 7 is a schematic overview depicting examples of standardized architectures for sharing Radio Access Networks.

The method actions performed by the determining module 11, for managing dual connectivity (DC) in a communications network 1 according to embodiments herein will now be described with reference to a flowchart depicted in FIG. 7. The actions do not have to be taken in the order stated below, but may be taken in any suitable order. Actions performed in some embodiments only are marked with dashed boxes. The communications network comprises a first and a second RAN node 12, 13. The first RAN node 12 manages a first user plane bearer for a UE 10. The DC comprises communicating with the UE 10 over the first RAN node 12 and the second RAN node 13 simultaneously. The first RAN node 12 may herein also be referred to as an MeNB and the second RAN node 13 may be referred to as an SeNB.

Action 701: The determining module 11 obtains information about characteristics of the UE 10 and/or information about characteristics of a transport network between the first RAN node 12 and the second RAN node 13.

Thereby a real time and/or dynamic control of DC can be achieved, wherein adaption of DC, such as e.g. whether DC should be removed or activated, may be controlled depending on e.g. the traffic on a specific bearer.

The characteristics of the UE 10, which hereinafter is also referred to as UE characteristics, may comprise one or more active services of the UE 10 and/or a Quality of Service, QoS, requirement for the one or more active services on the first user plane bearer. In some embodiments the QoS requirements may be an UE-Aggregate Maximum Bit-Rate, AMBR, or an Access Point Name, APN, AMBR. In some embodiments the UE 10 characteristics may comprise a mobility pattern of the UE 10. The mobility pattern may e.g. comprise frequent or non-frequent handovers, both during longer periods and limited for the last hours. The mobility pattern may be a long-term mobility pattern and/or a mobility pattern during the last period of a defined length. The information is obtained in order to gain knowledge of the UE active service(s) and QoS requirements of these services. The services may e.g. be UE-AMBR, APN-AMBR or similar and may be combined with the QCI in order to gain knowledge of the mobility pattern.

The transport network characteristics may comprise a topology of the transport network in terms of logical interfaces, such as for example X2 connectivity, a load of the transport network, a packet loss of the transport network, a delay of the transport network and/or jitter of the transport network.

Furthermore, information regarding a transport network physical topology, and/or security gateway locations, and secure tunnel termination points in the transport network may be obtained and may be combined with the information regarding the transport network characteristics in order to determine if the UE 10 would benefit from DC.

In some embodiments the information may further comprise the RAT support, such as e.g. LTE and/or 5G, for the RAN nodes comprised in the communications network 1.

In some embodiments the information about the UE characteristics may be combined with the information of the transport network physical topology, and/or security gateways locations, and secure tunnel termination points in order to further increase the accuracy of the determining to adapt DC, which further increases the performance in the network.

A common scenario for an operator when connecting to LTE RAN and EPC CN is hiring of transport capacity with a certain Service Level Agreement (SLA) from an Internet Service Provider (ISP). The SLA may e.g. comprise a specific bandwidth and QoS support for the operator. This hired transport capacity is treated as un-secure since the traffic will be mixed with traffic from other users and may traverse through e.g. parts of the Internet. Another common scenario is that the operator also owns the transport network between LTE RAN and EPC CN and can therefore design and maintain the transport network to meet any new requirements on the transport domain. This type of "own" transport may be treated as secure or un-secure.

Figure 8:
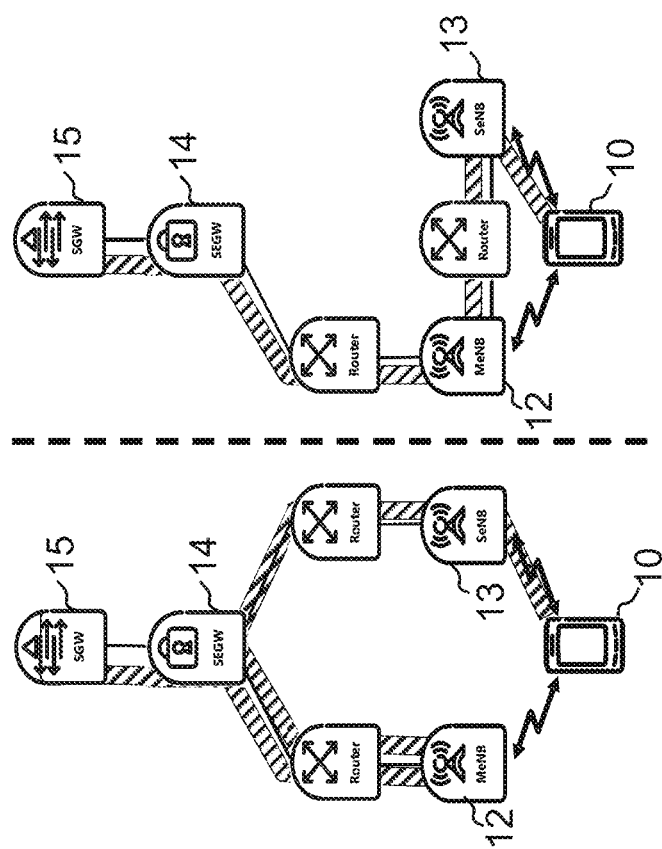
FIG. 8a is a schematic overview depicting a first scenario of transport domain impact on DC.
FIG. 8b is a schematic overview depicting a second scenario of transport domain impact on DC.

Two examples of the impact on the Dual Connectivity from the transport domain in a state of the art communications network are shown in FIGS. 8a and 8b. Although this example relates to LTE or 5G, the same or similar problems may occur in other RATs.

FIG. 8a shows a transport deployment in which a "Split bearer" DC results in transport tromboning. The reason for the tromboning in the left side of the figure is the following. The first RAN node 12, which herein is referred to as MeNB, and the second RAN node 13, herein referred to as SeNB, are not directly connected and the only way these two nodes can communicate with each other is via a central Security Gateway (SEGW). This means that the X2-interface used for DC is also via the SEGW, the communication path may e.g. be MeNB-Router-SEGW-Router-SeNB. In some scenarios the X2 interface may also be protected via two separate IPsec tunnels, one between the MeNB and the SEGW and another one between the SeNB and the SEGW. The S1-U traffic is received by the MeNB from the SGW via the SEGW and the shown Router. When the MeNB decides to activate a Split bearer the only way to forward traffic towards the SeNB is to transmit it back via the SEGW. This behavior may be referred to as tromboning. The tromboning in this case means that any traffic that the MeNB decides to forward via the SeNB is "tromboned" in the network as following: SGW→SEGW→Router→MeNB→Router→SEGW→Router→SeNB.

Due to the tromboning an extra delay is introduced in the network. In a simple example, the transport delay between SEGW and both MeNB and SeNB may be 10 ms. In this case the total transport delay for the tromboned traffic would be 30 ms, i.e. 3 times higher compared to traffic forwarded via the MeNB to the UE 10. Hence, although the FIG. 8b shows a case in which transport tromboning may be avoided, or reduced, also for the Split bearer option. In this case the SeNB is directly connected towards the MeNB via a Router, for example using a direct IPsec tunnel. In this case the additional transport delay for traffic sent to the UE 10 via the SeNB is reduced and consists only of the transport delay on the path MeNB→Router→SeNB.

Hence, by taking the characteristics of the transport network into account when determining if the UE 10 would benefit from activating DC over the SeNB, the delay in the network can be reduced which improves the QoE for the user.

The information may be obtained by the determining module 11 by receiving the information from a neighbouring entity, such as e.g. the second network node 13, the UE 10, an analytics engine and/or a configuration database, or by means of measurements and/or by means of analytics.

The information may be received directly from different nodes in the network. The information regarding bearers and QoS requirements may for example be received from the core network node 14, such as e.g. the MME. Since the core network node 14 is located higher up in the network topology than the RAN node 12 and has a wider knowledge of the network 1; it may be beneficial that the information from the core network node is taken into consideration by the determining module.

Another source for information regarding the active services of the UE 10 may e.g. be a Traffic Detection Function (TDF) or the UE 10 itself. The TDF is a functional entity that may perform application detection and reporting of the detected application and service data flow description of the detected application to a Policy and Charging Rules Function (PCRF). The TDF may be located on an SGi-interface i.e. "above" the PDN-GW as seen e.g. from the RAN point of view. It is connected to the PCRF and may be used to detect applications and service/packet flows.

The information regarding the transport network topology may be received directly from a configuration database.

The information regarding transport network load, packet loss, delay, and jitter may e.g. be obtained by means of measurements on the transport network. The measurements may be performed by the determining module.

The information regarding UE mobility patterns and transport network characteristics may be obtained by means of analytics that can be more or less advanced. The UE mobility patterns may e.g. be derived from analysis of how the UE 10 has moved historically, and/or how other UEs 10 with similar movement patterns are moving. The transport network characteristics, such as load, loss, delay and/or jitter, may on the other hand be based on statistics, and/or hourly/daily/weekly variations.

The analysis or analytics may broadly be grouped into Batch Analytics and Stream Analytics. Batch Analytics may be performed on data that is stored before it is processed and Stream Analytics may be performed on data in real-time before the data is stored. Both have their merits and may be used for different purposes. Batch processing may be used for trend analytics collected over longer time periods, whereas stream processing is needed when analytics is used for controlling systems in real-time. The combination of historic- and real time data is extremely powerful and allows for better decisions and the ability to take the right actions. Analytics may be used for reactive and proactive actions. Reactive means acting after something has happened and proactive means taking measures to avoid that it happens. The analytics may be performed in different parts of the network, such as e.g. in a RAN node 12, such as an eNodeB, in a core network node 14, such as e.g. an MME, in the Serving GW 15, in the PDN-GW 17 and/or in an OTT-server. In some embodiments the transport domain may also provide analytics functionality. In addition, network level analytics may be used, wherein information is collected from different "Analytics" functions in the network and sent to a more central network level database. The network level database may then enable analytics functionality on the network level.

The information may be collected and analyzed on different levels; in for example a distributed variant the determining module 11 may be located in a RAN node 12, such as e.g. and eNB, and may perform local actions for analyzing the information using an analytics function, the analyzed information may then be fed back to an eNB logic such as e.g. a Radio Resource Management (RRM). In this case the analytics may be seen as local actions.

In another embodiment, a more centralized variant of "Analytics" may be performed on a network level. Information from multiple sources may be collected by an analytics engine to a more central network database. In addition, information from this central network database may be fed back to the existing network functions. In one example such information may be sent back to the determining module 11 or an eNB logic, such as e.g. the RRM, allowing possible new use cases and functionality based on this new information available.

In some embodiments herein, the information may be obtained by the determining module 11 by measuring a load of the transport network, measuring a packet loss of the transport network, measuring a delay of the transport network and/or measuring jitter of the transport network.

In some embodiments the determining module 11 may obtained the information by determining, while using analytics, the characteristics of the UE 10 and/or the characteristics of the transport network.

Figure 9:
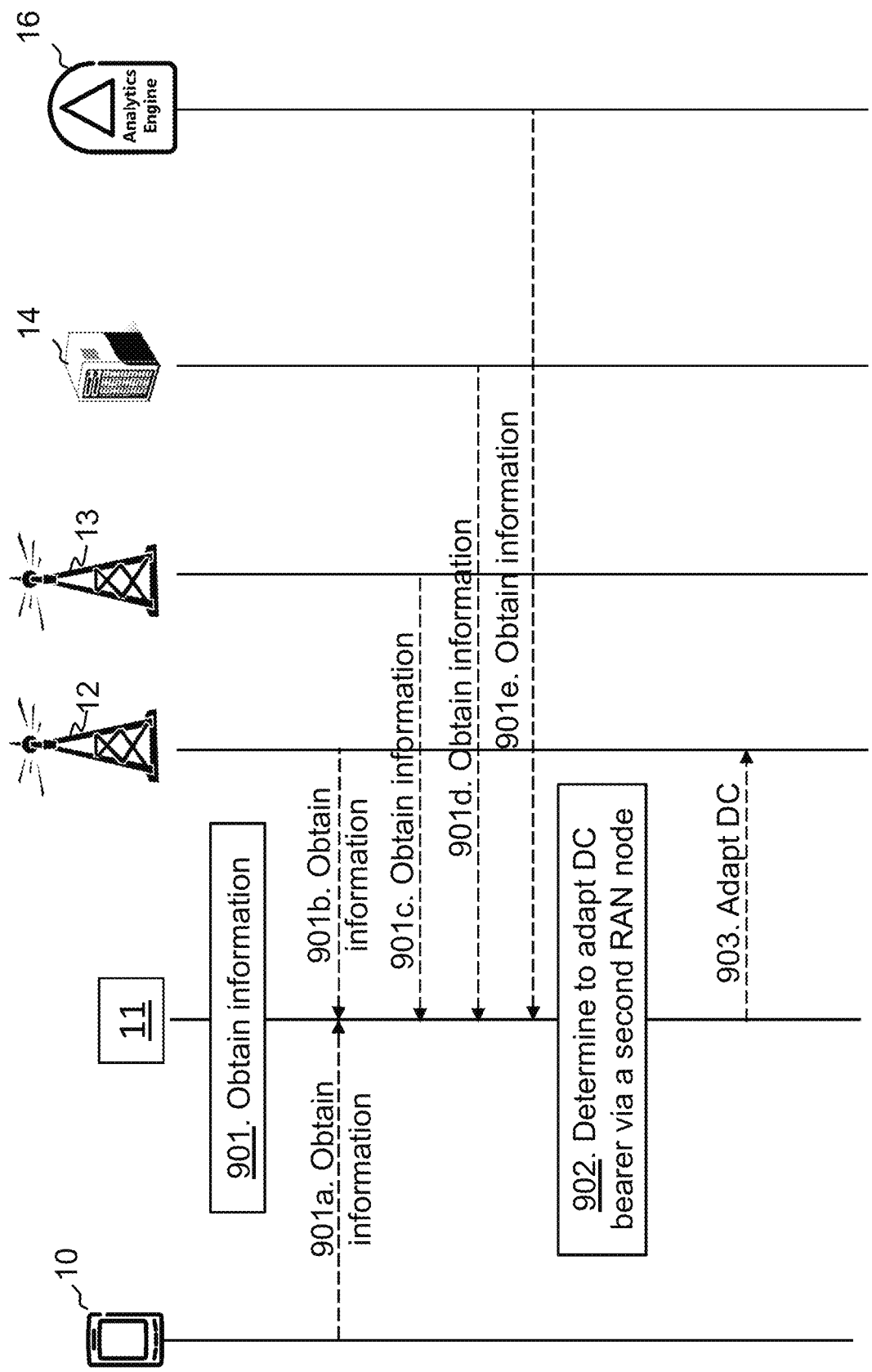
FIG. 9 is a signaling diagram depicting SeNB addition according to embodiments herein.

This action is similar to the action 903 described in relation to FIG. 9 and to actions 1004-1008 described above in relation to FIG. 10.

Action 702: The determining module 11 determines, based on the obtained information, to adapt DC for the first user plane bearer via the second RAN node 13 for communication with the UE 10.

Adapting DC for the first user plane bearer may comprise activating DC for the first user plane bearer via the second RAN node 13, deactivating DC for the first user plane bearer via the second RAN node 13 and/or modify the DC for the first user plane bearer, such as e.g. selecting a different RAN node than the second RAN node 13 to be the SeNB for DC.

The determining to adapt DC for the first user plane bearer may comprise determining which type of DC bearer to establish. The type of DC bearer may be one of a Secondary Cell Group, SCG, bearer or a split bearer.

The determining may comprise determining whether the UE 10 would benefit from DC or not.

When DC is not activated, and the determining module 11 determines that the UE 10 would benefit from DC, the determining module may further decide to activate DC for the UE 10.

When DC is activated, and the determining module 11 determines that the UE 10 does not benefit from DC, the determining module 11 may further decide to deactivate DC.

When DC is activated the determining module 11 may further determine to adapt the DC by modifying the active DC. This modifying may e.g. comprise activating DC via a different RAN node than the second RAN node 13.

The determining may be performed by combining the obtained QoS requirements for the UE 10, the mobility pattern of the UE 10, and the transport network characteristics into a defined algorithm. There might be additional criterion apart from QoS that might impact the determining, such as e.g. route optimization and/or signaling load optimizations based on the mobility pattern of the UE 10.

Figure 10:
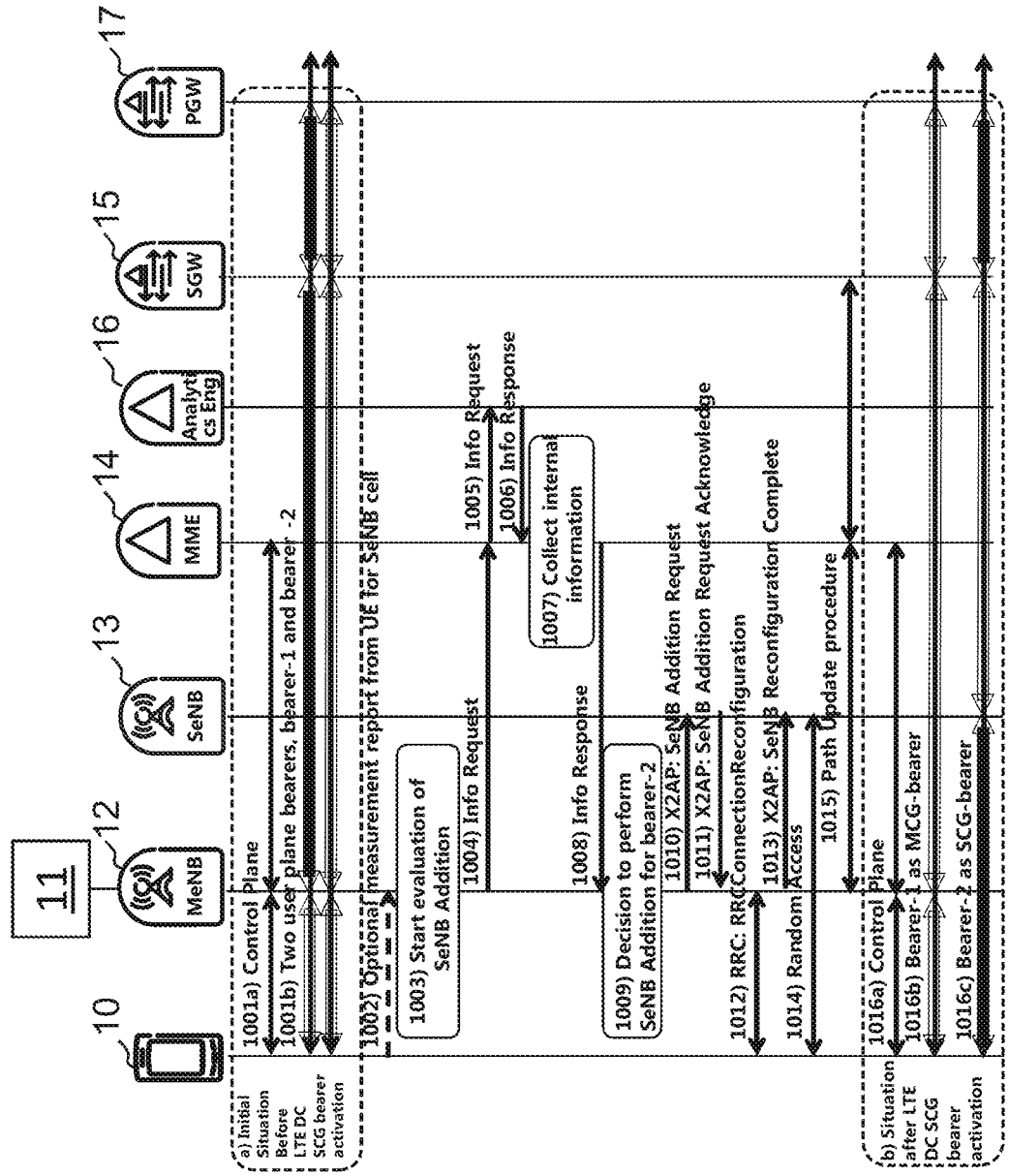
FIG. 10 is a signaling diagram depicting SeNB addition for an SCG bearer according to an exemplary embodiment herein.

This action 702 is similar to the action 903 described in relation to FIG. 9 and action 1009 described in relation to FIG. 10.

Action 703: The determining module 11 may adapt DC for the first user plane bearer via the second RAN node 13 for communication with the UE 10. This is done in order to achieve the gains that the DC has been determined to have.

The determining module may adapt the DC by activating DC for the first user plane bearer via the second RAN node 13, by deactivating DC for the first user plane bearer via the second RAN node 13 and/or by adapting the DC for the first user plane bearer, such as e.g. selecting a different RAN node than the second RAN node 13 to be the SeNB for DC. This action 703 is similar to the action 903 described in relation to FIG. 9 and to actions 1010-1015 described in relation to FIG. 10.

The determining module 11 may be a hardware or a software module and may be comprised in one or more network nodes, such as a RAN node or a core network node or may be may be performed by one or more network nodes in the set of nodes. The following alternative solutions may be possible:

According to some embodiments, the determining module 11 may be comprised in a core network node 14, such as e.g. the MME. The determining module 11 comprised in the core network node 14 may determine whether or not the UE 10 will benefit from DC, based on the obtained information. The determining module 11 comprised in the core network node 14 may further determine to adapt DC for the UE 10. Adapting DC may comprise activating DC, deactivating DC and/or modifying DC, such as e.g. selecting a different RAN node than the second RAN node 13 to be the SeNB for DC.

The determining module 11 comprised in the core network 14 node may further determine which type of DC to activate, such as e.g. SCG bearer or bearer split. The determining module 11 comprised in the core network node 14 may adapt DC by sending a command to the RAN node 12, such as e.g. the eNB. The RAN node 12 then executes the command from the determining module 11 comprised in the core network node 14. When decision is to be made, the required information may either be available, or could be sent to determining module 11 on a periodical basis, or the determining module 11 comprised in the core network node 14 could request information in advance from the other network nodes, such as e.g. eNB(s) and other sources such as analytics engines 16.

According to further embodiments, the determining module 11 may be comprised in an RAN node 12, such as e.g. an eNB. Based on the obtained information, the determining module 11 comprised in the RAN node 12 may decide on DC usage and on which method, such as e.g. SCG bearer or bearer split, to use. When the DC decision is to be made, the required information may either be available, or could be sent to determining module 11 comprised in the RAN node 12 on a periodical basis, or the determining module 11 comprised in the RAN node 12 could request information in advance from other network nodes such as e.g. one or more neighbor RAN node(s), core network node(s) and/or other sources such as analytics engines.

According to a further embodiment, the information obtained by the determining module 11 may comprise an advice from the core network node 14, such as e.g. the MME, on whether to adapt, such as e.g. activating, deactivating and/or modifying, DC or not. The information may further comprise an advice on which type of DC, such as e.g. SCG bearer or bearer split, that is most beneficial. The advice may be based on information that may be made available in the core network node. The determining module 11 may however take the final decision and either ignore the advice from the core network node 14 or decide to perform the actions according to the advice. This scenario may e.g. be possible when the determining module 11 is comprised in the RAN node 12. Information is assumed to be available in a similar manner as in the previous embodiments.

In yet a further embodiment, the information obtained by the determining module 11 may comprise a prohibition from the core network node 14, such as e.g. the MME, on the adaption of DC and/or on the type of DC to activate. The prohibition may comprise a limitation on the activation of the DC, such as e.g. and/or on the type of DC method, such as e.g. SCG bearer or bearer split to use. The determining module 11 may decide to adapt DC with these limitations taken in consideration. This scenario may e.g. be possible when the determining module 11 is comprised in the RAN node 12. Information is assumed to be available in a similar manner as for the embodiment described above.

In some embodiments the determining module 11 may obtain the information from analytics engines 16 and/or functions in the network 1. The determining module 11 may decide on DC usage, and which method, such as e.g. SCG bearer or bearer split, to use based on the obtained information. When a decision to use DC is to be made, the required information may either be available, or may be sent to the determining module 11 on a periodical basis, or the determining module 11 may request information in advance from one or more neighboring analytics engines 16 and/or functions. The analytics engines 16 and/or functions may be standalone devices and/or may be comprised in a network node, such as e.g. a RAN node 12 or a core network node 14.

FIG. 9 shows a signaling flow for the embodiments disclosed herein.

Action 901: The determining module 11 obtains information about characteristics of the UE 10 and/or information about characteristics of a transport network between the first RAN node 12 and the second RAN node 13. The determining module 11 may obtain information by performing measurements in the network 1 and analyzing these measurements.

The determining module may however also obtain the information, by e.g. receiving information from the UE 10 as shown in Action 901*a*, from the first RAN node 12 as shown in Action 901*b*, from the second RAN node 13 as shown in Action 901*c*, from a core network node 14 as shown in Action 901*d* or from the analytics engine 16 as shown in Action 901*e*.

Action 902: The determining module 11 determines, based on the obtained information, to adapt DC for the first user plane bearer via the second RAN node 13 for communication with the UE 10.

Action 903: The determining module 11 may adapt DC for the first user plane bearer via the second RAN node 13 for communication with the UE 10. This may be done by sending a request to the first RAN node 12 to perform the actions 1010-1015 as described in relation to FIG. 10.

FIG. 10 shows the signaling flow for one exemplary embodiment of the different embodiments disclosed herein. In this example, the determining module 11 is comprised in the first RAN node 12, which in this case is referred to as MeNB. The determining module 11 obtains information from a core network node 14, such as the MME and/or an analytics engine 16. The core network node 14 may collect the different information upon request from the first RAN node 12, and may send the information, which may comprise advices about DC usage on an UE level to the determining module 11 comprised in the first RAN node 12, herein referred to as the MeNB. The analytics engine 16 may further collect information which is not directly available in the MME. The analytics engine 16 may be a standalone device or may be comprised in any of the network nodes.

Action 1001: The steps 1001*a*) and 1001*b*) show an initial situation before LTE Dual Connectivity (DC) is activated. The control plane signaling for the UE 10 is transmitted via the first RAN node 12 to the core network node 14, which in this case is an MME. Two user plane bearers, bearer-1 and bearer-2 are established for the UE 10 via the first RAN node 12 to a Service Gate Way (SGW).

Action 1002: In some embodiments the determining module 11 comprised in the first RAN node 12 obtains a measurement report for a cell belonging to the second RAN node 13, which herein also is referred to as the SeNB, from the UE 10. The measurement report may comprise a Channel Quality Indicator (CQI) for the cell belonging to the second RAN node 13.

Action 1003: The determining module 11 decides to start evaluation of an activation of a DC, which may herein also be referred to as a SeNB Addition procedure. This decision may for example be based on UE measurement reporting on any cell/carrier handled by the second RAN node 13, as disclosed in action 1402, and possible load information exchange between the first RAN node 12 and the second RAN node 13. The determining module 11 may also base this decision on bearer level information for active bearers for the UE 10, such as e.g. QoS parameters, and for example select bearer-2 as a candidate for SeNB Addition.

Action 1004: The determining module 11 may obtain information by sending an Info Request message to the core network node 14, such as e.g. the MME, requesting additional information for the SeNB Addition decision. This message may comprise information about the bearers, such as e.g. bearer-2. In case no bearer information is included, the information about which bearer(s) to activate SeNB Addition for may be obtained from the core network node 14 in step 1008. This message may also comprise information about the second RAN node that is a candidate for the SeNB Addition procedure. In this example, the Info Request message is sent from the determining module 11 comprised in the first RAN node 12 to the core network node 14 as part of the SeNB Addition evaluation process.

Figures 13, 14, 15:
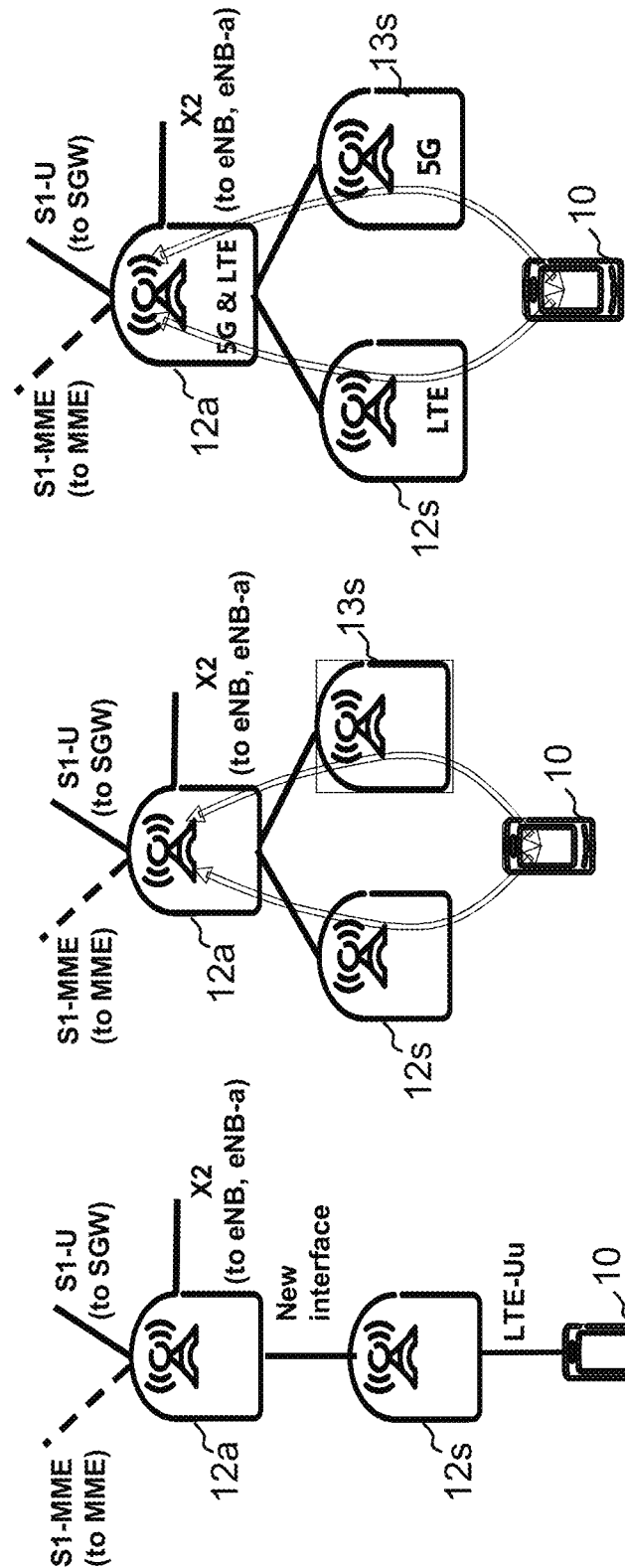
FIG. 13 is a schematic overview depicting a RAN with a functional split architecture.
FIG. 14 is a schematic overview depicting LTE DC in a RAN with a functional split architecture.
FIG. 15 is a schematic overview depicting LTE DC in a RAN with a functional split architecture.

In another embodiment, the Info Request message may be sent periodically from the determining module 11 to the core network node 14. In this case actions 1004-1008 may already be performed, and the logic in FIG. 14 is to move directly from action 1003 to action 1009.

Action 1005: The core network node 14 may further obtain information by sending a request to the Analytics Engine 16 and request additional information that may be useful for the determining module 11 in order to perform the SeNB Addition decision. Also in this case an Info Request message may be sent from the core network node 14 to the Analytics Engine 16. The message may contain information about the UE 10, such as e.g. IP-addresses of the UE 10, the current MeNB for the UE 10, the candidate SeNB for the UE 10 and may further contain information about the current bearers for the UE 10.

Action 1006: The Analytics Engine 16 may send an Info Response message to the core network node 14 with the additional information requested. This message may comprise information about the transport characteristics and topology between the first RAN node 12 and the second RAN node 13. It may also comprise information about active services on the different bearers for the UE 10, and if these are feasible for DC usage.

Action 1007: The core network node 14 may further collect any local information available which may be relevant to the determining module 11 for the SeNB Addition decision and may combine the local information with the information received from the Analytics Engine 16 in action 1006. The local information may for example comprise the previous mobility pattern of the UE 10 for a longer period of time than what is known in the first RAN node 12.

Action 1008: The core network node 14 may send an Info Response message to the determining module 11 comprised in the first RAN node 12. This message may comprise a "Dual connectivity assistance information" Information Element (IE). This IE may be a simple "Yes/No for DC" or it may comprise for example "Yes—use SCG bearers" or "Yes—use split bearers". In yet another embodiment, the IE may provide information on bearer level indicating which of the bearers should be used or not be used for the SeNB activation. In another embodiment the detailed information may be sent to the determining module 11. In this case the core network node 14 may send for example the transport characteristics and topology, knowledge of active services for the UE 10 and the UEs 10 previous mobility pattern to the determining module 11 in the first RAN node 12 in separate IEs for further analysis.

In some embodiments herein, the Info Response message may be sent periodically from the core network node 14 to the determining module 11, without the determining module 11 sending a request for the information to the core network node 14.

Action 1009: The determining module 11 may determine to perform the SeNB Addition for bearer-2 based on local information available in the first RAN node 12, and information obtained from the core network node and/or the Analytics Engine 16.

Action 1010: When the determining module 11 has determined that DC via the second RAN node 13 is beneficial the determining module 11 may activate the DC by instructing the first RAN node 12 to send a SeNB Addition Request to the second RAN node 13. The SeNB Addition Request may then be sent to the second RAN node 13 via the first RAN node 12.

Action 1011: The second RAN node 13 may acknowledge the SeNB Addition Request by sending a SeNB Addition Request Acknowledge to the first RAN node 12.

Action 1012: The first RAN node 12 may then send a Radio Resource Control (RRC) Connection Reconfiguration message to the UE 10, which reconfigures the UE 10 for DC via the first RAN node 12 and the second RAN node 13.

Action 1013: When the UE 10 has been reconfigured for DC, the first Ran node 12 may send a SeNB Reconfiguration Complete message to the second RAN node 13.

Action 1014: The UE 10 and the second RAN node 13 then perform random access to establish a connection.

Action 1015: The first RAN node 12, the core network node 14 and the SGW perform a Path Update procedure in which the first RAN node 12 informs the core network node 14 about the addition of the second RAN node 13 as a serving RAN node for bearer-2 of the UE 10. The core network node 14 further sends a message to the SGW requesting a user plane update for bearer-2 of the UE 10.

Action 1016a-c: When the DC has been activated, the control plane signaling for the UE 10 is still transmitted via the first RAN node 12 to the core network node 14, in this case is the MME. The first user plane bearer, herein referred to as bearer-1, is a MCG bearer in which the UE 10 communicates with the communications network via the first RAN node 12, the SGW and the PGW. The second user plane bearer, herein referred to as Bearer-2, is established for the UE 10 via the second RAN node to the SGW and the PGW.

Figure 11:
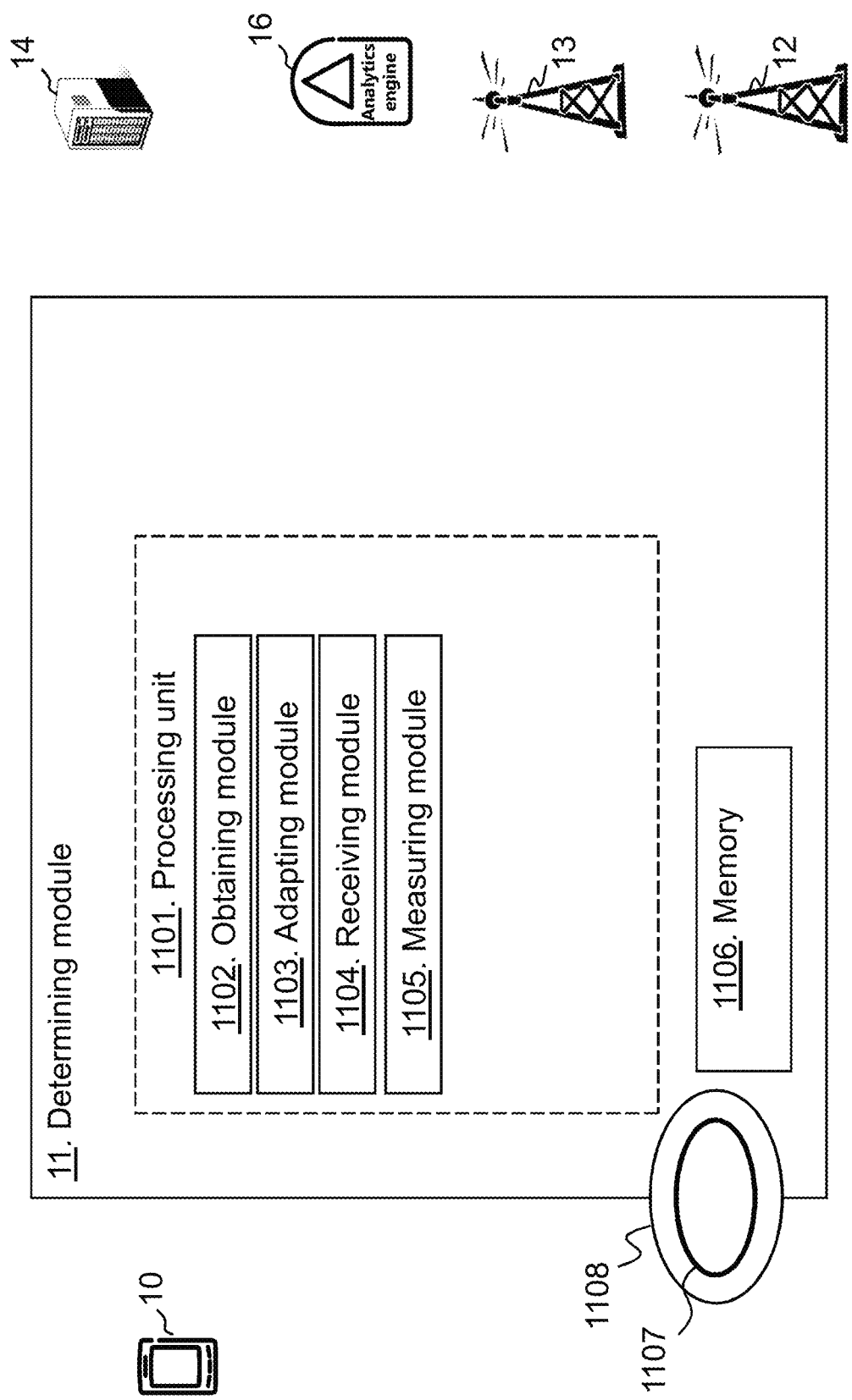
FIG. 11 is a block diagram depicting a determining module according to embodiments herein.

FIG. 11 is a block diagram depicting the determining module 11 for managing dual connectivity (DC) in a communications network 1. The communications network comprises a first and a second RAN node. The first RAN node 12 manages a first user plane bearer for a UE 10. The DC comprises communicating with the UE 120 over the first RAN node 12 and the second RAN node 13 simultaneously. The determining module 11 may comprise a processing unit 1101, e.g. one or more processors, configured to perform the methods described herein.

The determining module 11 is configured to, e.g. by means of an obtaining module 1102 and/or the processing unit 1101 being configured to, obtain information about characteristics of the UE 10 and/or information about characteristics of a transport network between the first RAN node 12 and the second RAN node 13. The UE 10 characteristics may comprises one or more active services of the UE 10 and/or a Quality of Service, QoS, requirement for the one or more active services on the first user plane bearer. The QoS requirements may be an UE-Aggregate Maximum Bit-Rate, AMBR, or an Access Point Name, APN, AMBR. The UE characteristics may further comprise a mobility pattern of the UE 10.

The transport network characteristics may comprise a topology of the transport network, a load of the transport network, a packet loss of the transport network, a delay of the transport network and/or jitter of the transport network.

The determining module 11 is configured to, e.g. by means of the processing unit 1101 being configured to, determine, based on the retrieved information, to adapt DC for the first user plane bearer for communication with the UE 10.

The determining module 11 may further be configured to, e.g. by means of the processing unit 1101 or an adapting module 1103 being configured to, adapt DC for the first user plane bearer for communication with the UE 10.

The determining module 11 may further be configured to, e.g. by means of the processing unit 1101 or the adapting module 1103 being configured to, adapt DC for the first user plane bearer by activating DC for the first user plane bearer via the second RAN node 13 for communication with the UE 10.

The determining module 11 may further be configured to, e.g. by means of the processing unit 1101 or the adapting module 1103 being configured to, adapt DC for the first user plane bearer by deactivating DC for the first user plane bearer via the second RAN node 13 for communication with the UE 10.

The determining module 11 may further be configured to, e.g. by means of the processing unit 1101 or the adapting module 1103 being configured to, adapt DC for the first user plane bearer by modifying the DC for communication with the UE 10, such as e.g. selecting a different RAN node than the second RAN node 13 as SeNB.

The determining module 11 may further be configured to, e.g. by means of the processing unit 1101 being configured to, determine which type of DC bearer to establish, wherein the type of DC bearer is one of a Secondary Cell Group, SCG, bearer or a split bearer.

The determining module 11 may further be configured to, e.g. by means of an obtaining module 1102 and/or the processing unit 1101 and/or a receiving module 1104 being configured to, obtain the information by receiving the information from a second network node 13, from the UE 10 and/or from a configuration database, by means of measurements and/or by means of analytics.

The determining module 11 may further be configured to, e.g. by means of an obtaining module 1102 and/or the processing unit 1101 and/or a measuring module 1105 being configured to, obtain information about characteristics of the transport network by measuring a load of the transport network, a packet loss of the transport network, a delay of the transport network and/or jitter of the transport network.

The determining module 11 may further be configured to, e.g. by means of the obtaining module 1102 and/or the processing unit 1101 being configured to, obtain the information by determining, while using analytics, the characteristics of the UE 10 and/or the characteristics of the transport network.

The determining module 11 further comprises a memory 1106. The memory 1106 comprises one or more units to be used to store data on, such as system information, IDLE mode mobility information, network slice information, wireless device IDs, network slice and roaming policies, Slice IDs, applications to perform the methods disclosed herein when being executed, and similar.

The methods according to the embodiments described herein for the determining module 11 are respectively implemented by means of e.g. a computer program 1107 or a computer program product, comprising instructions, i.e., software code portions, which, when executed on at least one processor, cause the at least one processor to carry out the actions described herein, as performed by the determining module. The computer program 1107 may be stored on a computer-readable storage medium 1108, e.g. a disc or similar. The computer-readable storage medium 1108, having stored thereon the computer program, may comprise the instructions which, when executed on at least one processor, cause the at least one processor to carry out the actions described herein, as performed by the determining module. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

Although the embodiments herein are described for an LTE-like architecture it shall be noted that they are equally applicable to any architecture based on an evolution of the S1 interface, such as e.g. 5G.

One way to support tight multi-RAT integration in 5G may be based on a RAN functional split. In this functional split, RAN functions running at the network side may be classified into synchronous and asynchronous functions and/or function groups.

A synchronous function may be defined as having tight processing requirements, such as e.g. allowed Service Data Unit (SDU) processing time and/or state information, to other synchronous functions and to the time-domain structure of an air interface. In addition, functions belonging to one synchronous functional group may be deployed in the same network node. One example of a synchronous functional group in LTE may be: "radio resources scheduling at downlink" at the MAC layer, "channel status information (CSI) reception" at the PHY layer and SDUs fragmentation/reassembly at the RLC layer. These synchronous functional groups may typically be located at the same network node and close to the air interface.

An asynchronous RAN function at the network side may be defined as a function that does not have any tight processing requirements to any synchronous functions nor to the air interface. Asynchronous functions typically have the flexibility to be placed in different logical nodes, while being connected via an inter-node interface. In addition to this, the asynchronous function at the network side is more flexible and may be deployed further from the air interface.

Figure 12:
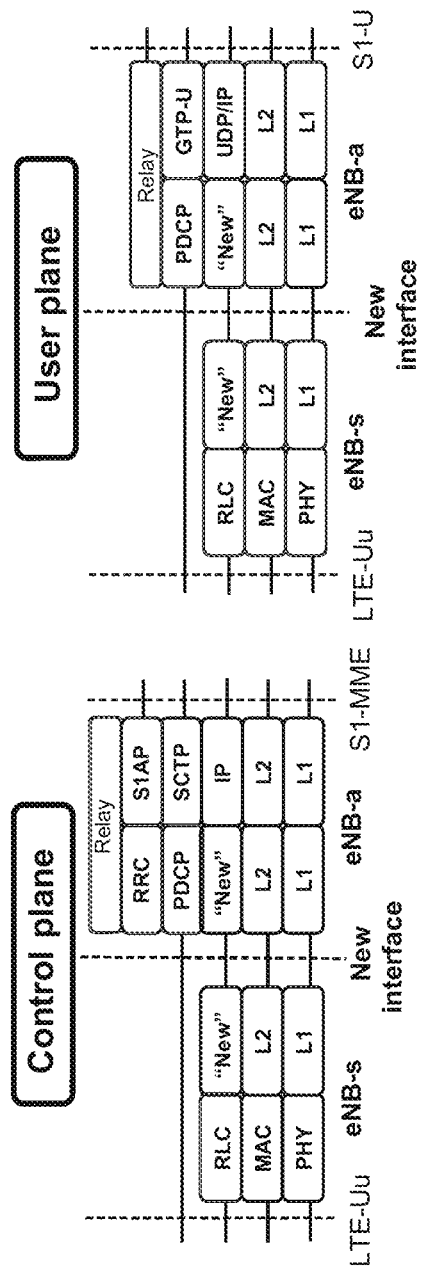
FIG. 12 is a block diagram depicting an eNB with a functional split into an eNB-a and an eNB-s.

One example of the base station split architecture, herein discussed in an LTE context, is shown in FIG. 12. The functional split of the eNB 12 results in two new functional entities or logical network elements: An eNB-asynchronous (eNB-a) 12a and an eNB-synchronous (eNB-s) 12s. FIG. 12 shows the eNB-a 12a for both the control plane and for the user plane. According to different embodiments, these parts of the eNB-a 12a may be either combined or separated.

FIG. 13 shows an exemplary network architecture view of the combined eNB-a 12a scenario.

The functional split may also enable Dual Connectivity solutions within LTE or within any other air interface for both control and user planes. The eNB-a 12a may be a common point when the UE 10 is connected via two or more different eNB-s 12s, 13s. This is shown in FIG. 14 in which the UE 10 is connected via both an eNB-s1 12s and an eNB-s2 13s to the eNB-a 12a. The eNB-a 12a comprises in general the asynchronous functions, such as e.g. the common protocols for both control plane, such as RRC and PDCP, and user plane such as PDCP.

The classification of RAN functions on the network side into synchronous and asynchronous functions may also be considered for tight multi-RAT integration context. One such context is 5G networks that are likely to include both LTE-compatible, which is also referred to as LTE Evolution, and non-LTE-compatible radio accesses, which may also be referred to as e.g. New Radio (NR). Hence a functional split for an integrated architecture of multiple air interfaces, air interface variants of the different RATs, features envisioned for 5G networks to enable seamless and/or lossless mobility between multiple RATs and control plane and user plane ultra-reliability may be defined. The non-LTE-compatible RAT in 5G context is very likely to have different lower layer protocols than LTE-compatible RATs, e.g. due to the high frequencies which the RAT may operate and/or the new use cases which it may be required to address.

FIG. 15 shows an extended functional split methodology with DC. Assuming that a given UE 10 is able to connect to multiple air interfaces, either simultaneously or at different times, the previous functional split methodology may be extended so that the same instance of asynchronous functions may be defined for these multiple air interfaces and having distinct synchronous functional groups per air interface, such as e.g. compatible-LTE and non-compatible LTE parts in the 5G radio access. The UE 10 may be connected to these multiple air interfaces simultaneously or during mobility procedures. In this case the eNB-a 12a may comprise common support for both control and user plane for the asynchronous functions and the eNB-s 12s, 13s may contain the synchronous functions. Furthermore, this also enables RAT-specific synchronous functions, such as e.g. different functions for LTE-compatible RATs and non-LTE-compatible RATs. Such a scenario is shown in FIG. 15, where the eNB-a 12a has support for 5G and LTE and the first eNB-s 12s, has support for LTE and the second eNB-s 13s has support for 5G.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a determining module, for managing dual connectivity (DC) in a communications network, wherein the communications network comprises a first and a second Radio Access Network (RAN) node, wherein the first RAN node manages a first user plane bearer for a User Equipment (UE) and wherein the DC comprises communicating with the UE over the first RAN node and the second RAN node simultaneously, wherein the method comprises:
   activating DC for the first user plane bearer for the UE via the second RAN node for communication with the UE;
   obtaining information about characteristics of the UE and characteristics of a transport network between the first RAN node and the second RAN node, wherein the characteristics of the UE comprises one or more Quality of Service (QoS) requirements for one or more active data flows of the UE on the first user plane bearer,
   determining to adapt the activated DC for the first user plane bearer, based on the QoS requirements for the one or more active service data flows of the UE on the first user plane bearer; and
   adapting the activated DC for the first user plane bearer based on the QoS requirements for the one or more active service data flows of the UE on the first user plane bearer.

2. The method according to claim 1, wherein
   adapting the activated DC for the first user plane bearer comprises deactivating the activated DC for the first user plane bearer based on the QoS requirements for the one or more active service data flows of the UE on the first user plane bearer.

3. The method according to claim 1, wherein the adapting comprises modifying the activated DC for the first user plane bearer based on the QoS requirements for the one or more active service data flows of the UE on the first user plane bearer.

4. The method according to claim 1, wherein the QoS requirements is an UE-Aggregate Maximum Bit-Rate, AMBR, or an Access Point Name, APN, AMBR.

5. The method according to claim 1, wherein the UE characteristics further comprises a mobility pattern of the UE.

6. The method according to claim 1, wherein the transport network characteristics comprises a topology of the transport network, a load of the transport network, a packet loss of the transport network, a delay of the transport network and/or jitter of the transport network.

7. The method according to claim 3, wherein modifying the activated DC for the first user plane bearer comprises selecting a different RAN node than the second RAN node for the activated DC for the first user plane bearer.

8. The method according to claim 1, wherein the information is obtained by receiving the information from a second network node, from the UE and/or from a configuration database, by means of measurements and/or by means of analytics.

9. The method according to claim 6, wherein the information is obtained by measuring a load of the transport network, a packet loss of the transport network, a delay of the transport network and/or jitter of the transport network.

10. The method according to claim 1, wherein the information is obtained by determining, while using analytics, the characteristics of the UE and/or the characteristics of the transport network.

11. A determining module, for managing dual connectivity (DC) in a communications network, wherein the communications network comprises a first and a second Radio Access Network (RAN) node, wherein the first RAN node manages a first user plane bearer for a User Equipment (UE) wherein the DC comprises communicating with the UE over the first RAN node and the second RAN node simultaneously, wherein the determining module comprises a processing unit including one or more processors configured to:
   activate DC for the first user plane bearer for the UE via the second RAN node for communication with the UE;
   obtain information about characteristics of the UE and characteristics of a transport network between the first RAN node and the second RAN node, wherein the characteristics of the UE comprises one or more Quality of Service (QoS) requirements for one or more active data flows of the UE on the first user plane bearer,
   determine to adapt the activated DC for the first user plane bearer, based on the QoS requirements for the one or more active service data flows of the UE on the first user plane bearer; and
   adapt the activated DC for the first user plane bearer based on the QoS requirements for the one or more active service data flows of the UE on the first user plane bearer.

12. The determining module according to claim 11, wherein the determining module further is configured to:
   adapt the activated DC for the first user plane bearer by deactivating the activated DC for the first user plane bearer based on the QoS requirements for the one or more active service data flows of the UE on the first user plane bearer.

13. The determining module according to claim 11, wherein the determining module further is configured to:
   adapt the activated DC by modifying the activated DC for the first user plane bearer based on the QoS requirements for the one or more active service data flows of the UE on the first user plane bearer.

14. The determining module according to claim 11, wherein the QoS requirements is an UE-Aggregate Maximum Bit-Rate, AMBR, or an Access Point Name, APN, AMBR.

15. The determining module according to claim 11, wherein the UE characteristics comprises a mobility pattern of the UE.

16. The determining module according to claim 11, wherein the transport network characteristics comprises a topology of the transport network, a load of the transport network, a packet loss of the transport network, a delay of the transport network and/or jitter of the transport network.

17. The determining module according to claim 13, wherein the determining module is configured to modify the activated DC for the first user plane bearer by selecting a different RAN node than the second RAN node for the activated DC for the first user plane bearer.

18. The determining module according to claim 11, wherein the determining module is configured to obtain the information by receiving the information from a second network node, from the UE and/or from a configuration database, by means of measurements and/or by means of analytics.

* * * * *